Feb. 13, 1940. D. A. SEALEY 2,189,964
RANGE FINDER
Filed April 25, 1938
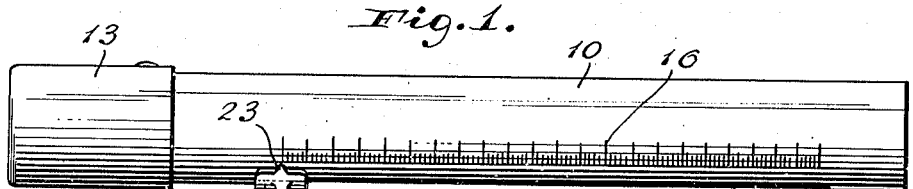
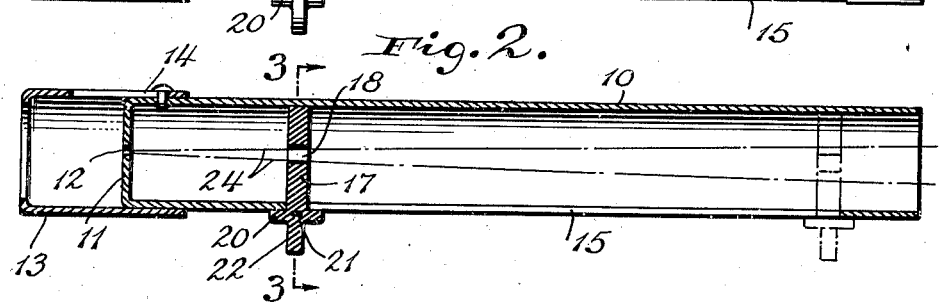
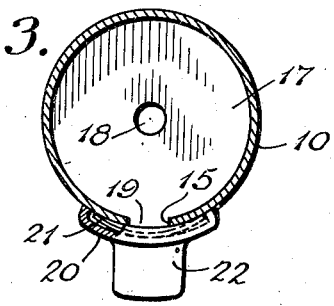
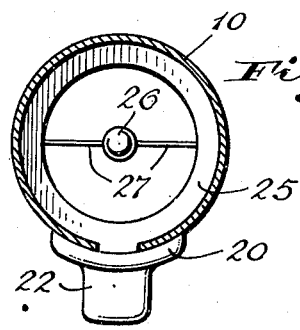
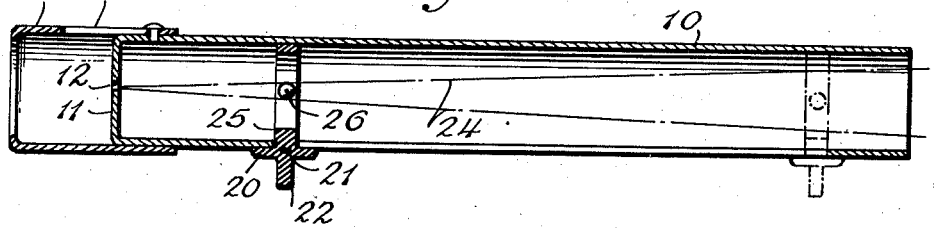
INVENTOR
DAVID A. SEALEY
BY
Mueller & Ruhl
ATTORNEYS Patented Feb. 13, 1940

2,189,964

UNITED STATES PATENT OFFICE 2,189,964

RANGE FINDER

David A. Sealey, East Orange, N. J.

Application April 25, 1938, Serial No. 204,060

5 Claims. (Cl. 33—64)

This invention relates to improvements in range finders and has for one of its objects the provision of a device of simple, practical and economical construction by means of which distances within the range of the instrument may be, at least, approximately determined.

Another object is to mount a diaphragm in association with an elongated tube provided with a sight opening at one end thereof, and to provide for the adjustment of said diaphragm relative to said opening to positions wherein the visual angle between said opening and diaphragm, with respect to a distant object, may be obtained, and the distances to said object determined by the position of said diaphragm relative to calibrated graduations on said tube.

The above and other objects will appear more clearly from the following detailed description when taken in connection with the accompanying drawing which illustrates preferred embodiments of the inventive idea.

In the drawing:

Figure 1 is a side elevation of a range finding instrument constructed in accordance with one form of the invention.

Figure 2 is a longitudinal section therethrough.

Figure 3 is a section on the line 3—3 of Fig. 2.

Figure 4 is a view similar to Fig. 2 showing another form of the invention.

Figure 5 is a transverse section through the device of Fig. 4.

Among the practical uses to which an instrument of the character herein described may be adapted, is one in which a golfer desires to ascertain the approximate distance to a given point such as the pin or other object on a golf green. By sighting the instrument on said object which, for purposes of calibrating the distance graduations on the tube in the manufacture thereof, is of a known or uniform height, and then adjusting the diaphragm so that the same will exactly encompass the object, particularly with respect to its vertical extremes, the visual angle between the sight opening of the instrument and said object is ascertained. An associated part of the diaphragm is positioned, by the adjustment thereof, relative to the graduations on the tube so that a distance reading may be obtained.

Referring more particularly to Figs. 1 to 3 the instrument is shown as comprising an elongated tube 10 of uniform diameter having one end 11 thereof closed and provided therein with a pinhole sized sight opening 12. If desired, an eyepiece in the form of an open ended sleeve 13 may be slidably mounted upon the closed end of the tube 10 by a pin and slot connection 14, this eye-piece being provided for the purpose of spacing the eye of the observer from the sight opening 12 when using the instrument. Between the ends of the tube the same is provided with an elongated longitudinally extending slot 15 the length of which is determined by the size of the instrument and the effective range thereof, the inner and outer ends of the slot representing, respectively, the minimum and maximum distances which may be ascertained by the use of the instrument. Along one edge of the opening the tube has marked thereon the distance graduations 16 which are calibrated in accordance with certain factors including the known height of the distant object upon which the instrument is focused, the length of the slot 15 and the distance of any extreme or mean point thereof from the sight opening 12, and the effective size of the center of the diaphragm 17 which is slidably mounted within the tube 10 for adjustment toward and away from the sight opening 12. As disclosed in the modification being described, the diaphragm 17 is in the form of a disc of a diameter which fits within the tube 10 and is provided with a central opening 18 aligned with the sight opening 12 and of larger size than the latter opening depending upon the range of the instrument as, for example, about one sixteenth of an inch in diameter.

A reduced web 19 of the diaphragm 17 projects through the slot 15 in the tube 10 and terminates exteriorly of said tube in a circumferentially extending recessed flange 20 which contacts the exterior of said tube so as to act as a guide for the diaphragm as the latter is adjusted along the length of the tube. A small leaf spring 21 may be seated within the recess of the flange 20 with its ends engaging the exterior of the tube so as to exert an outward pressure upon the flange 20 and thus maintain the lower portion of the periphery of the diaphragm 17 in intimate frictional contact with the interior of the tube 10 so that the diaphragm will be held in various positions of adjustment along the tube. In order to manipulate the diaphragm, the flange 20 is provided with an extension 22 forming a handle or finger piece which may be gripped when sliding the diaphragm back and forth. The flange is also provided with a pointer 23 which moves along the graduations 16 when the diaphragm is adjusted and which is utilized to indicate the distance from the observer to a distant object after the diaphragm has been properly focused upon the latter so that the top and bottom of the opening 18 are aligned with the upper and lower extremities of said distant object, thereby ascertaining the visual angle indicated by the dot and dash lines 24. When the visual angle has thus been ascertained by the adjustment of the diaphragm longitudinally of the tube the pointer 23 will then indicate on the scale or graduation 16 the distance from the sight opening 12 to the distant object. Such distance is in the same proportion to the height of the object as the distance between the openings 12 and 18 is to the diameter of the latter opening. Thus, there is present the equation wherein $D:O::d:o$, in which large D is the unknown distance, large O the known height of the distant object, small $d$ the known distance between the openings 12 and 18, and small $o$ the known diameter of the opening 18.

In the embodiment of the invention shown in Figs. 4 and 5 the diaphragm 25 is in the form of a ring fitted within the tube 10 and having supported in its center an object such as a small ball 26 which may be of the same diameter as the opening 18 in the diaphragm 17. Said ball may be mounted in position by means of two diametrically extending wires 27 having their outer ends secured to the inner periphery of the ring 25 and their inner ends to opposite sides of the ball 26. Otherwise the diaphragm and its associated parts such as the flange 20 and handle 22 are of the same construction as shown in Fig. 3. Likewise, the diaphragm is adjustable back and forth within the tube 10, when sighting a distant object, until the ball 26 is in a position wherein the same will obscure from the vision of the observer the two vertical extremes of the distant object, thereby ascertaining the visual angle and the resultant distance on the scale 16.

What is claimed is:

1. In a range finder, a tube having a sight opening therein and provided with a longitudinal slot, distance graduations along one edge of said slot, a diaphragm within said tube and having an aperture therein of greater diameter than said sight opening and alined therewith, and means including a pointer carried by said diaphragm and extending through said slot for adjusting said diaphragm longitudinally of said tube to ascertain the visual angle between said sight opening and a distant object through said aperture, said pointer moving over said graduations.

2. In a range finder, a tube having a sight opening therein and provided with a longitudinal slot, distance graduations along one edge of said slot, a diaphragm within said tube and having an aperture therein of greater diameter than said sight opening and alined therewith, means including a pointer carried by said diaphragm and extending through said slot for adjusting said diaphragm longitudinally of said tube to ascertain the visual angle between said sight opening and a distant object through said aperture, said pointer moving over said graduations, and a spring interposed between said tube and said diaphragm adjusting means.

3. In a range finder, a tube having a sight opening therein, a sighting diaphragm movable longitudinally within said tube and relative to said sight opening, and cooperating indicating means on said tube and diaphragm for ascertaining the distance of a distant object from said sight opening as said diaphragm is moved relative to said tube to vary the visual angle between said object and opening through said diaphragm.

4. In a range finder, a tube having a sight opening therein, and further having a slot extending longitudinally thereof, distance graduations on said tube adjacent said slot, a sighting diaphragm within said tube cooperating with said sight opening, and means carried by said diaphragm and extending through said slot for adjusting said diaphragm along said tube to secure the distance between the former and said sight opening, said means having a pointer in association with said graduations.

5. In a range finder, a tube having a sight opening therein and provided with a longitudinal slot, distance graduations along one edge of said slot, a diaphragm movable along said tube and supporting an object-obscuring member in alignment with said opening, said diaphragm being movable along said tube to positions wherein said member will obscure a distant object and thereby determine the visual angle between said opening and said object, and a handle for said diaphragm extending through said slot and having a pointer cooperating with said graduations.

DAVID A. SEALEY.